(12) United States Patent
Vaghasiya et al.

(10) Patent No.: US 12,307,096 B2
(45) Date of Patent: May 20, 2025

(54) ZONE WRITE OPERATION TECHNIQUES

(71) Applicant: Micron Technology, Inc., Boise, ID (US)

(72) Inventors: Rakeshkumar Dayabhai Vaghasiya, Hyderabad (IN); Anilkumar Rameshbhai Sindhi, Hyderabad (IN); Dhruv Chauhan, Hyderabad (IN); Mani Raghavendra Aravapalli, Hyderabad (IN)

(73) Assignee: Micron Technology, Inc., Boise, ID (US)

( * ) Notice: Subject to any disclaimer, the term of this patent is extended or adjusted under 35 U.S.C. 154(b) by 94 days.

(21) Appl. No.: 17/892,661

(22) Filed: Aug. 22, 2022

(65) Prior Publication Data

US 2024/0061587 A1    Feb. 22, 2024

(51) Int. Cl.
*G06F 3/06* (2006.01)

(52) U.S. Cl.
CPC .......... *G06F 3/0616* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2008/0126680 A1* | 5/2008 | Lee | G06F 3/064 |
| | | | 711/E12.001 |
| 2015/0268860 A1* | 9/2015 | Yum | G06F 3/061 |
| | | | 711/154 |
| 2020/0272356 A1* | 8/2020 | Zhang | G06F 3/0604 |
| 2020/0356306 A1* | 11/2020 | Subbarao | G06F 3/0659 |
| 2021/0257027 A1* | 8/2021 | Nishikawa | G11C 16/08 |
| 2022/0113905 A1* | 4/2022 | Agarwal | G06F 3/0631 |
| 2022/0382454 A1* | 12/2022 | Yang | G06F 3/0679 |
| 2023/0359391 A1* | 11/2023 | Uttarwar | G06F 3/0656 |

* cited by examiner

*Primary Examiner* — Yaima Rigol
*Assistant Examiner* — Alexander J Yoon
(74) *Attorney, Agent, or Firm* — Holland & Hart LLP

(57) ABSTRACT

Methods, systems, and devices for zone write operation techniques are described. A memory system may support zone write operations directly to a multiple-level cell cursor of the memory system. For example, the memory system may close a first zone associated with storing a first type of information from being written with additional information. Based on closing the first zone, the memory system may determine a rate at which the first type of information is written to the memory system. The memory system may receive a command to write second information of the first type to a second zone of the memory system. To write the second information to the second zone, the memory system may write the second information to a cursor configured to store information written to the second zone, and the cursor may be associated with multiple-level memory cells based on the first rate.

25 Claims, 7 Drawing Sheets

ZONE WRITE OPERATION TECHNIQUES

FIELD OF TECHNOLOGY

The following relates to one or more systems for memory, including zone write operation techniques.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
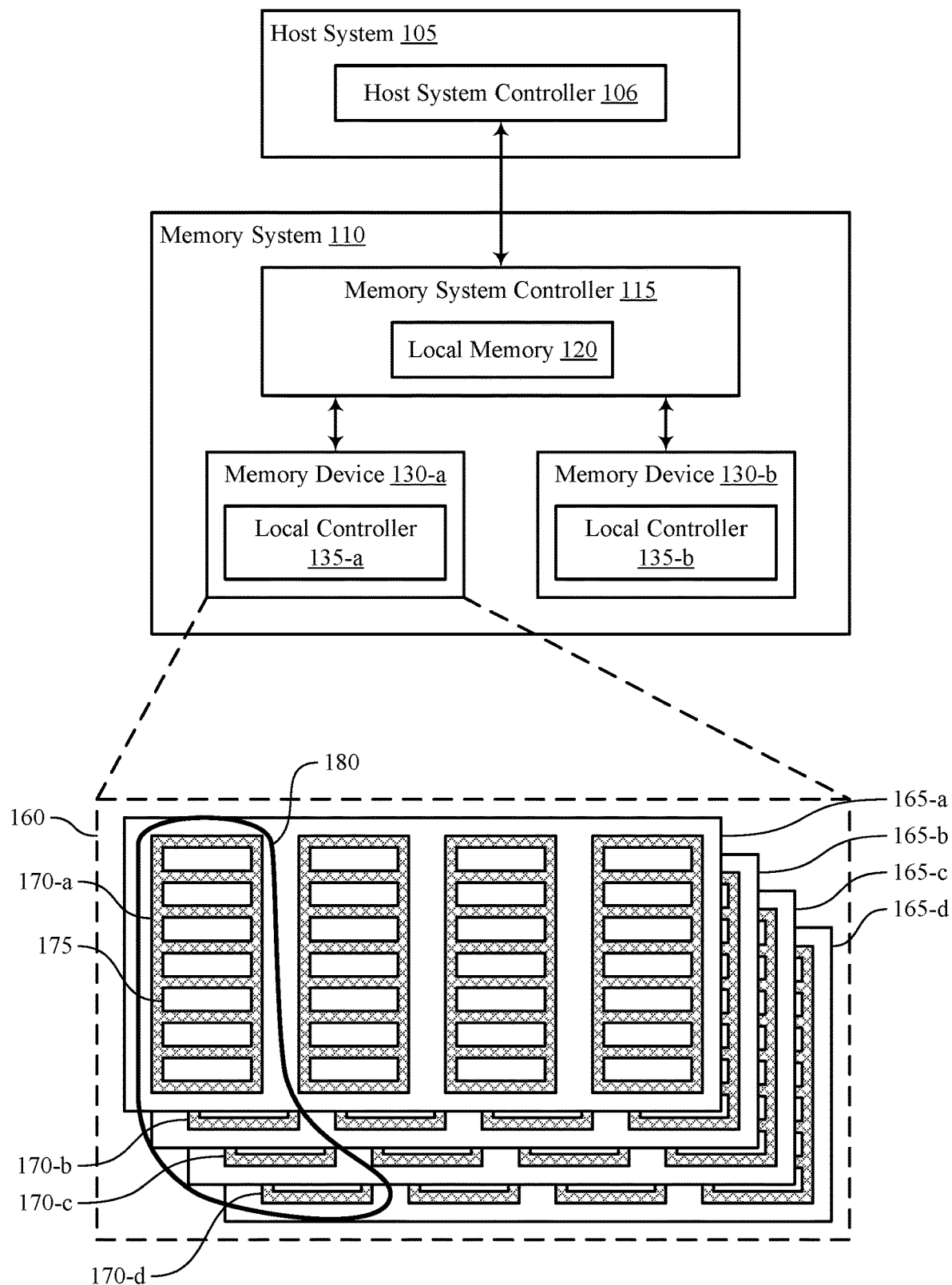
FIG. 1 illustrates an example of a system that supports zone write operation techniques in accordance with examples as disclosed herein.

A system may implement an architecture (e.g., a zoned namespace (ZNS) architecture, a Flash-Friendly File System (F2FS) that may implement a ZNS architecture) that supports zone writes, such that information (e.g., data, node information, such as metadata) of different types (e.g., hot, warm, cold, among other information types) may be written to respective zones of the memory system. For example, a storage space of the memory system may be divided into subsets (e.g., ranges) of logical addresses (e.g., logical block addresses (LBAs)), and a contiguous subset of logical addresses may be referred to as a zone of the memory system. A host system may transmit a write command to the memory system to write information of a given type to a zone configured to store the given type of information. The memory system may include cursors, which may refer to locations (e.g., physical locations, physical addresses) within the memory system configured to store information written to one or more zones, such as blocks or virtual blocks. In some examples, the memory system may receive the write command and write the information to a cursor corresponding to the zone (e.g., configured to store information written to the zone).

Zone write operation techniques may reduce memory management operations, such as garbage collection operations and others, which may reduce the terabytes written (TBW) of the memory system (e.g., the total quantity of information written to memory cells of the memory system, for example, as part of access operations and memory management operations, among others), which may extend an operable life of the memory system. For example, reducing memory management operations may reduce a phenomenon referred to as "write amplification," which may refer to a relationship between an amount of information to be stored (e.g., a size of write information commanded by a host system) and an amount of information physically written to memory cells (e.g., a cumulative size of write operations performed on memory cells of the memory system to maintain the information to be stored, including write operations associated with moving or rewriting information).

A memory system may include different types of cursors to which the memory system may write information, which may be associated with a storage density of memory cells associated with the cursors. For example, a memory system may include one or more single level cell (SLC) cursors that are associated with memory cells configured to store a single bit of information, one or more multiple-level cell cursors that are associated with memory cells configured to store more than a single bit of information (e.g., two or more bits of information), or various combinations thereof. In some cases, the memory system may write information received from a host system directly to one or more SLC cursors and subsequently fold (e.g., move, rewrite) the information from the one or more SLC cursors to a multiple-level cell cursor (e.g., due to resource constraints that limit a quantity of multiple-level cell cursors that may be concurrently opened and written to). However, folding the information may be associated with an increase in write amplification, which may increase the TBW of the memory system and decrease an operable life of the memory system.

In accordance with examples as described herein, a memory system may be configured to support zone write operations directly to a multiple-level cell cursor. For example, the memory system may include multiple zones (e.g., open zones) that are each associated with storing information of a different type (e.g., hot data, warm data, cold data, hot node information, warm node information, cold node information, among other types). The memory system, may support a finite (e.g., configured, limited) quantity of concurrently opened multiple-level cell cursors (e.g., one open multiple-level cursor at a time, two concurrently open multiple-level cell cursors) and may thus not support maintaining a multiple-level cell cursor open for each open zone to support direct writing to the multiple-level cell cursor. Some types of information (e.g., hot data), however, may be written relatively more frequently than other types of information, and prioritizing writing of such types of information directly to multiple-level cell cursors may be implemented to increase an operable life of the memory system. For example, the memory system may maintain one or more open cursors for storing information written to the respective zones (e.g., an SLC cursor for each open zone, a multiple-level cell cursor for all open zones). In some examples, the memory system may close a first zone associated with a first type of information (e.g., hot data) from being written with additional information, for example, based on writing information to each of the logical addresses included in the first zone. In response to closing the first zone, the memory system may determine a first rate at which the first type of information is written to the memory system relative to the other types of information. A second zone associated with the first type of information may be opened and, in some examples, if the first rate satisfies a threshold (e.g., is above a threshold, is a highest rate), the memory system may write information for the second zone directly to a multiple-level cell cursor (e.g., instead of an SLC cursor, to a multiple-level cell cursor that is exclusively for storing the first type of information). Thus, folding operations associated with writing the first type of information to a multiple-level cell cursor that stores (e.g., exclusively) the first type of information will be reduced or eliminated, thereby reducing a write amplification associated with the first type of information and reducing the TBW of the memory system. As a result, physical degradation of the memory cells of the memory system will be decreased, thus extending the life of the memory system.

Features of the disclosure are initially described in the context of systems, devices, and circuits with reference to FIG. 1. Features of the disclosure are described in the context of systems and process flows with reference to FIGS. 2 through 5. These and other features of the disclosure are further illustrated by and described in the context of a block diagram and flowchart that relate to zone write operation techniques with reference to FIGS. 6 and 7.

FIG. 1 illustrates an example of a system 100 that supports zone write operation techniques in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The host system 105 and the memory system 110 may communicate various types of information. For example, the host system 105 and the memory system 110 may communicate data and node information, which may correspond to metadata associated with the communicated data. In some examples, the host system 105 and the memory system 110 may communicate information associated with different expected life durations (e.g., different likelihoods of being overwritten or invalidated, such as within a period of time), which may correspond to different types of information. For example, hot information (e.g., hot data, hot metadata) may be associated with a shorter expected life duration relative to other types of information. Cold information (e.g., cold data, cold metadata) may be associated with a longer expected life duration relative to other types of information. Various other "degrees" of temperature, such as warm information, may be associated with expected life durations at various ranges between those of hot information and cold information. That is, each type of information may be associated with a respective expected life duration of the information.

In some examples, the host system 105 and the memory system 110 may support a ZNS implementation in which logical addresses (e.g., LBAs) of the memory system 110 may divided into respective zones. Each zone may correspond to a contiguous set (e.g., range) of logical addresses, and may be non-overlapping with other zones. In some cases, a zone may be associated with a particular type of information. For example, the host system 105 may transmit commands to write a first type of information to a first zone associated with the first type of information, commands to write a second type of information to a second zone associated with the second type of information, and so on. In other words, information written to a given zone may be of the type that is associated with the zone, while other types of information may be written to other corresponding zones.

The memory system 110 may operate in accordance with cursors, which may be associated with locations (e.g., addresses) where information written to various zones may be stored. For example, the memory system 110 may store (e.g., write) information written to one or more logical addresses of a zone at one or more physical addresses of a cursor. In some examples, a cursor may include one or more blocks of the memory system 110, such as one or more blocks 170 or virtual blocks 180. In some examples, a cursor may be used to store a single type of information (e.g., all information written to the cursor may be of the same type). In some other examples, a cursor may store multiple types of information. In some cases, a cursor may be associated with memory cells configured to operate in accordance with a particular storage density. For example a cursor may be associated with SLCs and may be referred to as an SLC cursor. In some cases, a cursor may be associated with multiple-level cells and may be referred to as a multiple-level cell cursor (e.g., a cursor including TLCs may be referred to as a TLC cursor, and so on).

In accordance with examples described herein, the memory system 110 may support zone write operations in which information of a type (e.g., a prioritized type) is written directly to a multiple-level cell cursor (e.g., a cursor associated with a relatively higher storage density), such as a TLC cursor. For example, the memory system 110 may support a finite quantity of multiple-level cell cursors being opened at the same time but may support a zone for each type of information to be opened at the same time. Thus, direct writing to a respective multiple-level cell cursor for each type of information may be unsupported, in which case at least some cursors may be operated in accordance with a relatively lower storage density (e.g., one or more SLC cursors). However, some types of information may be written relatively more frequently than other types of information. For example, hot data may be written relatively more frequently than other types of information, and thus a greater quantity of hot data may be written to the memory system 110 than other types of information. Accordingly, the memory system 110 may open a multiple-level cell cursor to which the memory system 110 may directly write a type of information that is written relatively more frequently (e.g., hot data) to reduce or eliminate folding operations associated with that type of information, thereby reducing a TBW of the memory system 110 and increasing an operable life of the memory system 110.

For instance, in response to a first zone associated with a first type of information being closed, the host system 105 may open a second zone associated with the first type of information, and the memory system 110 may determine a rate at which the first type of information is written to the memory system 110. If the rate is higher than rates associated with other types of information (e.g., or if the rate satisfies a threshold), the memory system 110 may write information written to the second zone directly to a multiple-level cursor (e.g., that exclusively stores the first type of information). Alternatively, if the rate is lower than rates associated with other types of information (e.g., or if the rate fails to satisfy a threshold), the memory system 110 may write information written to the second zone directly to cursor with a relatively lower storage density, such as an SLC cursor, or a multiple-level cell cursor that stores multiple types of information (e.g., that may be subsequently transferred to respective multiple-level cell cursors storing respective types of information, for example, during folding).

The system 100 may include any quantity of non-transitory computer readable media that support zone write operation techniques. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

Figure 2:
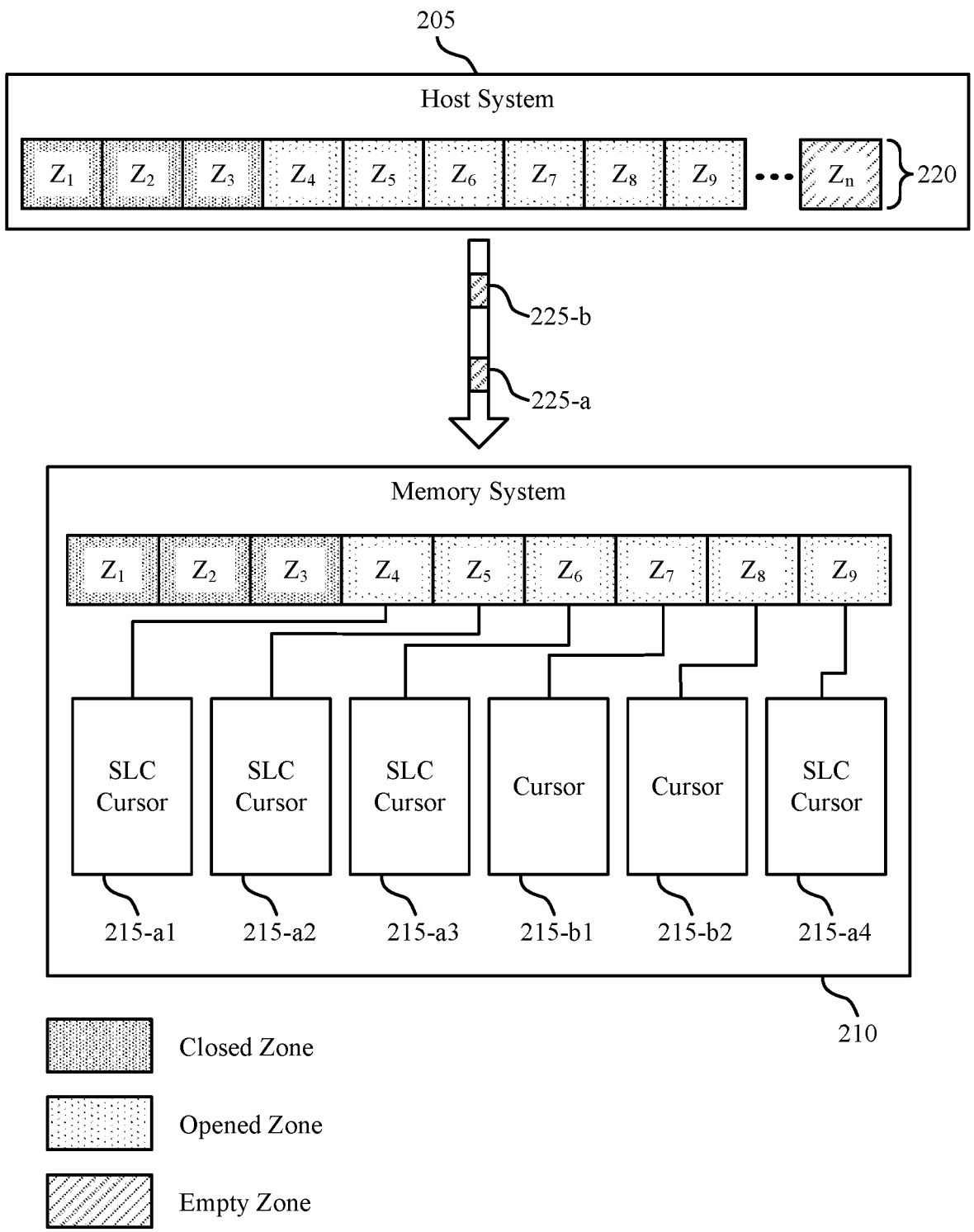
FIG. 2 illustrates an example of a system that supports zone write operation techniques in accordance with examples as disclosed herein.

FIG. 2 illustrates an example of a system 200 that supports zone write operation techniques in accordance with examples as disclosed herein. The system 200 may be an example of and implement aspects of a system 100, as described with reference to FIG. 1. For example, the system 200 may include a host system 205 and a memory system 210, which may be examples of a host system 105 and a memory system 110 described with reference to FIG. 1, respectively. In some cases, the memory system 210 may be configured to write information (e.g., data, metadata) directly to one or more cursors 215 that are associated with a relatively higher storage density (e.g., one or more multiple-level cell cursors 215) of the memory system 210, for example, to reduce the TBW associated with folding information from cursors 215 that are associated with a relatively lower storage density (e.g., SLC cursors 215), thereby decreasing physical degradation of memory cells of the memory system 210 and extending the life of the memory system 210, among other benefits.

The system 200 may implement a ZNS architecture (e.g., implemented by a flash memory management system, such as an F2FS, among other systems that may implement a ZNS architecture) that includes zones 220. For instance, the range of logical addresses (e.g., LBAs) of the memory system 210 may be divided (e.g., by the host system 205) into respective zones 220, where each zone 220 may be associated with a respective contiguous and non-overlapping subset of LBAs of the range of LBAs associated with the memory system 210. The host system 205 may write information of different types to respective zones 220, and the memory system 210 may store the information in respective cursors 215 that correspond to the respective zones 220.

The memory system 210 may include any quantity of zones 220, which may be associated with one or more memory devices 130 of the memory system 210. In the example of FIG. 2, the logical addresses of the memory system 210 may be divided into zones $Z_1$ to $Z_n$. A list of the zones 220 may be included in (e.g., managed by) the host system 205 and may be based on a storage capacity of the memory system 210 and a size of a zone. For example, the memory system 210 may have a 256 gigabyte (GB) storage capacity and, with a zone size of 256 megabytes (MB), the memory system 210 may include 1024 zones. In some examples, different zones 220 may have different sizes. In some cases, a finite (e.g., configured, limited) quantity of zones 220 may be open (e.g., active) at the same time, as indicated (e.g., published) by the memory system 210. For example, if the memory system 210 supports up to six open zones 220, the host system 205 may open up to six zones 220 at a time (e.g., one zone 220 for each of hot data, warm data, cold data, hot node information, warm node information, and cold node information).

Information may be sequentially written to a zone 220 of the memory system 210, such that the information is stored sequentially in the zone 220. In some cases, the memory system 210 may maintain a write pointer that indicates where (e.g., in terms of LBAs) next information may be written to the zone 220. In some examples, a write pointer for each zone 220 may indicate a state of the zone 220. For example, a write pointer may indicate that a zone 220 is in an empty state (e.g., that none of the logical addresses of the zone 220 have been written to), an implicit open state (e.g., that some, but not all, of the logical addresses of the zone 220 have been written to), or a full (e.g., closed) state (e.g., that every logical address of the zone 220 has been written to). For the empty state, the write pointer may point to the beginning of the zone 220 (e.g., to the first logical address of the zone 220). For the implicit open state, the write pointer may point to a logical address of the zone 220 (e.g., some logical address after the first logical address) for the next sequential write. For the full state, the write pointer may be invalid and may indicate that all logical addresses of the zone 220 have been written to.

In some cases, a zone 220 in the full state may be referred to as a closed zone 220 and additional information may be unable to be written to (e.g., prevented from being written to) the closed zone 220 (e.g., until the logical addresses are unmapped by the host system 205). For example, if the host system 205 transmits a command 225 (e.g., a write command) to write information to a closed zone 220, the memory system 210 may return an error. If a zone 220 becomes full (e.g., enters the full state), the memory system 210 (e.g., and the host system 205) may close the zone 220 and additional zones 220 may be opened by the host system 205 based on the zone 220 being closed. In some examples, a zone 220 in the empty state may be an example of a closed zone 220, for example, if the host system 205 has not yet opened the zone 220 to be written with information. In such examples, information may be written to the closed empty zone 220 if opened by the host system 205.

The memory system 210 may include cursors 215 corresponding to the zones 220 of the memory system 210. For example, the memory system 210 may maintain an open cursor 215 for each open zone 220 (e.g., six cursors 215), such that information written to an open zone 220 may be written to (e.g., stored in) a corresponding cursor 215. Each cursor 215 may include one or more blocks, such as one or more virtual blocks 180, one or more blocks 170, or a combination thereof, as described with reference to FIG. 1. Further, each cursor 215 may include physical blocks addressable by logical addresses of the zone 220 corresponding to each cursor 215. For example, the memory system 210 may receive commands (e.g., write commands 225) from the host system 205 indicating to write information to one or more logical addresses of a zone 220 of the memory system 210, and the memory system 210 may write the information to one or more physical addresses of the cursor 215 corresponding to the zone 220. In the example of FIG. 2, each cursor 215 may be configured to store a single type of information. Thus, information written to a given zone 220 that is associated with a given type may be written to a corresponding cursor 215 configured to store the given type of information.

The memory system 210 may include any quantity of cursors 215 that are associated with a relatively lower storage density, such as SLC cursors 215-*a* (e.g., SLC cursors 215-*a*1, 215-*a*2, 215-*a*3, 215-*a*4), where the SLC cursors 215-*a* may be associated with SLCs configured to store a single bit of information. The memory system 210 may also include any quantity of cursors 215-*b* that are associated with a relatively higher storage density, such as multiple-level cell cursors 215 (e.g., cursors 215-*b*1 and 215-*b*2), where the cursors 215-*b* may be associated with memory cells configured to store multiple bits of information (e.g., MLCs, TLCs, QLCs, and so on). For example, one or more cursors 215-*b* may be a TLC cursor, where the TLC cursor may include TLCs configured to store 3 bits of information. Although some of the examples described herein refer to SLC cursors 215 as an example of relatively lower-density cursors and multiple-level memory cell cursors 215 as an example of relatively higher-density cursors (e.g., having a density higher than relatively lower-density cursors), in some other examples of the described techniques, a multiple-level memory cell cursor of a first type (e.g., an MLC cursor) may be implemented as a relatively lower density cursor and a multiple-level memory cell cursor of a second type (e.g., a TLC cursor) may be implemented as a relatively higher density cursor.

The zones 220 of the memory system 210 may each be configured to store a respective (e.g., a single) type of information of a set of multiple types of information. For example, the information may be hot data, hot metadata, warm data, warm metadata, cold data, or cold metadata, among other types of information of various "degrees." In some cases, the type of information associated with a zone 220 may be determined by the host system 205. For example, the host system 205 may open a zone 220 and determine a type of information to write to the zone 220 based on (e.g., that is the same as) the type of information written to a most recently closed zone 220.

In some cases, the memory system 210 may support a finite (e.g., limited) quantity of zones 220 (e.g., a zone for each type of information) to be concurrently open, and an open zone (e.g., zones $Z_4$, $Z_5$, $Z_6$, $Z_7$, $Z_8$, $Z_9$) may be a zone 220 that may be written to (e.g., empty state if the supported quantity of concurrently open zones 220 is not already reached, implicit open state). For example, the memory system 210 may have six open zones 220 configured to store a different type of information (e.g., the six types of information described herein) to six cursors 215. A zone 220 may reach the full state, in which case information may no longer be written to the zone 220. In some such examples, the memory system 210 may close the zone 220 (e.g., zones $Z_1$, $Z_2$, $Z_3$) from being written with additional information, and the host system 205 may open another zone 220 for storing the same type of information as the closed zone 220. For example, a zone $Z_1$ configured to store hot data may reach the full state and may not store any additional hot data, and the memory system 210 may cease writing hot data to the zone $Z_1$ and close first zone $Z_1$. In response to the zone $Z_1$ closing, the host system 205 may open a zone $Z_7$ for storing hot data and may continue writing hot data to the zone $Z_7$.

In some cases, initially open zones (e.g., zones $Z_1$ through $Z_6$) of the memory system 210 may correspond to relatively lower-density cursors (e.g., SLC cursors 215-*a*). In response to an open zone 220 for storing a type of information closing, the memory system 210 may determine a rate at which the type of information is written to the memory system 210, for example, to determine whether to write information written to a next opened zone 220 for storing the type of information to an SLC cursor 215-*a* or a cursor 215-*b*. For example, while zone $Z_1$ is open, the host system 205 may transmit a write command 225-*a* to write hot data to zone $Z_1$. The memory system 210 may write the hot data to the zone $Z_1$ (e.g., by storing the hot data to a corresponding cursor 215, such as an SLC cursor 215-*a* or a cursor 215-*b*), which may cause the zone $Z_1$ to enter the full state. In response to the zone $Z_1$ becoming full, the memory system 210 (e.g., and the host system 205) may close the zone $Z_1$, and the memory system 210 may determine the rate at which hot data is written to the memory system 210. The memory system 210 may use the rate to determine whether to store subsequently written hot data in an SLC cursor 215-*a* or a cursor 215-*b*.

For example, in response to the zone $Z_1$ closing, the host system 205 may open the zone $Z_7$ to store the same type of information written to the zone $Z_1$ (e.g., hot data) and may transmit a write command 225-*b* to write hot data to the zone $Z_7$. In some examples, the memory system 210 may determine the rate at which hot data is written to the memory system 210 (e.g., a hot data rate) relative to other rates at which other types of information are written to the memory system 210 (e.g., compare the rate to the other rates), and the memory system 210 may determine to write the hot data of zone $Z_7$ to a cursor 215-*b* (e.g., a cursor 215-*b*1, a relatively higher-density cursor) based on (e.g., due to, in response to) the hot data rate being greater than the other rates. In some examples, the memory system 210 may determine that the hot data rate satisfies (e.g., meets or exceeds) a threshold rate and may write the hot data of zone $Z_7$ to the cursor 215-*b* based on the hot data rate satisfying the threshold.

In another example, the host system 205 may transmit a write command 225-*a* to write warm data to a zone $Z_2$ that is configured to store warm data, which may cause the zone $Z_2$ to enter the full state and be closed. The host system 205 may open a zone $Z_8$ to store additional warm data and may transmit a write command 225-*b* to write warm data to the zone $Z_8$. The memory system 210 may determine whether to write the warm data of zone $Z_8$ to an SLC cursor 215-*a* or a cursor 215-*b* based on a warm data rate (e.g., a rate at which warm data is written to the memory system 210) and, for example, a quantity of concurrently open cursors 215-*b* that the memory system 210 supports. For example, the memory system 210 may have a capability to maintain two (e.g., or more) cursors 215-*b* concurrently open. Here, while the warm data rate may be less than the hot data rate, it may be greater than the other remaining rates. Because the memory system 210 has the capability to maintain two open cursors 215-*b*, the memory system 210 may determine to write the warm data of zone $Z_8$ to a cursor 215-*b* (e.g., cursor 215-*b*2) based on the warm data rate being greater than the other remaining rates (e.g., while the cursor 215-*b*1 is open for storing hot data written to zone $Z_7$). Additionally, or alternatively, if the warm data rate satisfies the threshold rate, the memory system 210 may write the warm data of zone $Z_8$ to the cursor 215-*b* based on being able to maintain more than one open cursor 215-*b* at a time.

In some other examples, the memory system 210 may support maintaining one open cursor 215-*b* at a time. Here, the memory system 210 may determine to write the warm data of zone $Z_8$ to an SLC cursor 215-*a* based on the warm data rate being less than the hot data rate (e.g., or failing to satisfy the threshold rate), for example, in order to maximize a quantity of folding operations that are avoided as result of direct multiple-level cell cursor writes. For instance, information written to an SLC cursor 215-*a* may be subsequently folded to a cursor 215-*b*, but folding may be unnecessary for information written directly to a cursor 215-*b*. Accordingly, because hot data may be written at greater quantities than other types of information, prioritizing hot data for direct writing to a cursor 215-*b* over other types of information (e.g., if the memory system 210 supports a single open cursor 215-*b* at a time) may maximize the quantity of avoided folding operations compared to other types of information being directly written to a cursor 215-*b*.

In another example, the host system 205 may transmit a write command 225-*a* to write a type of information associated with a rate of being written to the memory system 210 that is lower than at least one other rate (e.g., cold data, cold node information, warm node information, warm data, hot node information) to a zone $Z_3$ that is configured to store the type of information, which may cause the zone $Z_3$ to enter the full state and be closed. The host system 205 may open a zone $Z_9$ to store additional information of the type and may transmit a write command 225-*b* to write the additional information to the zone $Z_9$. The memory system 210 may determine to write the additional information to an SLC cursor 215-*a* (e.g., a SLC cursor 215-*a*4) based on the rate being lower than at least one other rate, the rate failing to satisfy the threshold rate, or a combination thereof (e.g., to preserve direct writing of information to cursors 215-*b* for other types of information having higher rates of being written to the memory system).

By supporting writing information directly to relatively higher-density cursors 215-*b*, the memory system 210 will reduce folding operations of information from relatively lower-density SLC cursors 215-*a* to cursors 215-*b*. Reducing the folding operations of the memory system 210 will improve the TBW of the memory system 210, thereby reducing physical degradation of memory cells of the memory system 210 and prolonging the life of the memory system 210.

Figure 3:
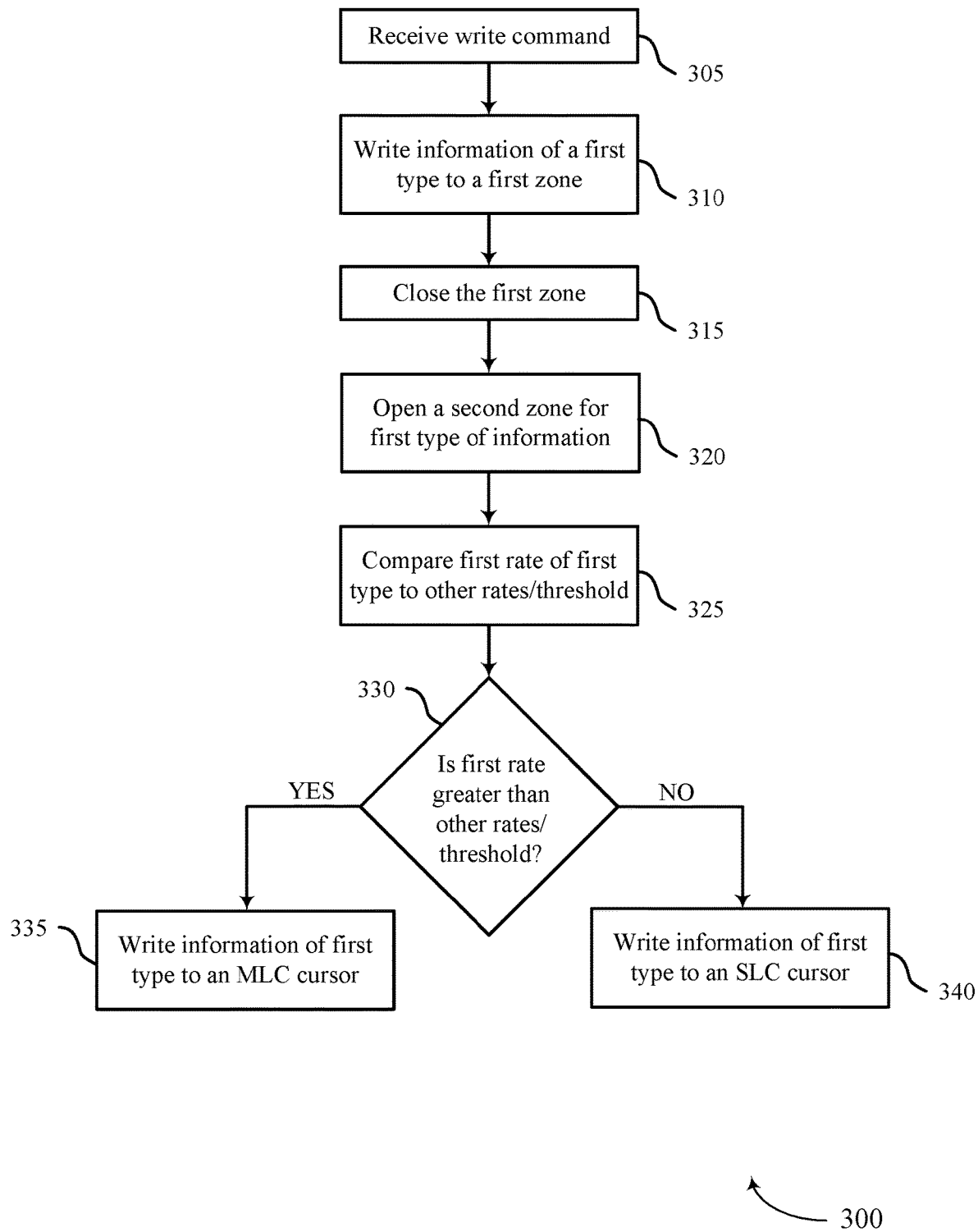
FIG. 3 illustrates an example of a process flow that supports zone write operation techniques in accordance with examples as disclosed herein.

FIG. 3 illustrates an example of a process flow 300 that supports zone write operation techniques in accordance with examples as disclosed herein. The process flow 300 may illustrate aspects or operations of systems 100 or 200, as described with reference to FIGS. 1 and 2, respectively. For example, the process flow 300 may depict operations at a memory system or a host system which, which may be examples of a memory system 110 or 210 and a host system 105 and 205, respectively, as described with reference to FIGS. 1 and 2. In the following description of the process flow 300, the methods, techniques, processes, and operations may be performed in different orders or at different times. Further, certain operations may be left out of the process flow 300, or other operations may be added to the process flow 300. The operations described herein may reduce the TBW associated with folding information from SLC cursors to multiple-level cell cursors by writing information directly to multiple-level cell cursors of the memory system, thereby decreasing physical degradation of memory cells of the memory system and extending the life of the memory system, among other benefits.

Aspects of the process flow 300 may be implemented by a controller, among other components. Additionally, or alternatively, aspects of the process flow 300 may be implemented as instructions stored in memory (e.g., firmware stored in a memory coupled with a memory system or a host system). For example, the instructions, when executed by a controller (e.g., the memory system or host system), may cause the controller to perform the operations of the process flow 300.

At 305, a write command may be received. For example, the memory system may receive a write command from the host system to write first information associated with a first type of information (e.g., hot data, warm data, cold data, hot metadata, and so on) to be written to a first zone of the memory system (e.g., a zone 220). In some examples, the write command may include an indication (e.g., a hint) that the first information is the first type. In some examples, the write command may exclude such an indication.

At 310, the first information of the first type may be written to the first zone of the memory system. For example, in response to the write command, the memory system may write the first information to the first zone that is configured to store the first type of information. In examples, the first zone may be one of multiple concurrently open zones of the memory system, where each open zone is configured to store a different type of information.

To write the first information to the first zone, the memory system may write first information to a cursor for storing information written to the first zone. In some cases, writing to the first zone may include writing the first information to an SLC cursor, such as an SLC cursor 215-*a*, as described with reference to FIG. 2. In some other cases, writing to the first zone may include writing the information to a multiple-level cell cursor, such as a cursor 215-*b*, as described with reference to FIG. 2. For example, if the memory system previously determined to store data written to the first zone in a multiple-level cursor based on a first rate at which the first type of information is written to the memory system (e.g., if the first type of information is hot data), the memory system may write the first information to the multiple-level cell cursor.

At 315, the first zone may be closed (e.g., from being written with additional information). For example, the first zone may enter (e.g., transition to) a full state based on being written with the first information, and the memory system (e.g., and the host system) may close the first zone in response such that the first zone may not store additional information.

At 320, a second zone configured to store the first type of information may be opened. For example, after first zone is closed, the host system may open the second zone (e.g., and configure the second zone to store the first type of information) to support writing additional information of the first type to the memory system. Accordingly, the host system may transmit a write command to the memory system to write second information associated with the first type of information to the second zone.

At 325, the first rate of the first type of information may be compared to rates of other types of information written to the memory system. Additionally, or alternatively, the first rate may be compared to a threshold rate. For example, in response to closing the first zone, the memory system may determine the first rate and the rates of the other types of information and compare the first rate to the rates of the other types of information. Additionally, or alternatively, the memory system may compare the first rate to the threshold rate.

In some examples, determining the first rate relative to the rates of the other types of information (e.g., comparing the rates) may include determining the rate of the first zone relative to other zones. For example, the memory system may determine a quantity of information of the other types that is written to respective zones between closing the first zone and the host system opening another zone for storing the first type of information. The memory system may determine a rate at which information was written to the first zone relative to the rates at which information is written to the other zones. between closing the first zone and the host system opening the other zone. In some examples, if indications of the types of information are included in write commands received from the host system, the memory system may track the quantity of each type of indication received. Here, determining the first rate relative to the rates of the other types of information may include comparing a quantity of indications of the first type to quantities of the indications of the other types of information.

At 330, it may be determined whether the first rate of the first type of information is greater than the rates of the other types of information, the threshold rate, or a combination thereof. If at 330, the memory system determines that the first rate is greater than the rates of the other types of information (e.g., the first type of information is hot data) or satisfies (e.g., is greater than, is greater than or equal to) the threshold rate, the process flow may continue to 335. Additionally, or alternatively, if, at 330, the memory system determines that the first rate is less than a second rate but greater than the remaining rates (e.g., the first type of information is warm data) and the memory system has the capability to have two or more multiple-level cell cursors concurrently open, the process flow may continue to 335. Alternatively, if, at 330, the memory system determines that the first rate is less than one or more of the other types of information (e.g., and the does not have the capability to have more than one multiple-level cell cursors open at a time, or the first rate is less than a greater quantity of other rates than the quantity of multiple-level cell cursors that the memory system may have concurrently open) or that the first rate is less than the threshold rate, the process flow may continue to 340.

At 335, the second information associated with the first type may be written to a multiple-level cell cursor of the memory system. For example, based on the determination at 330, the memory system may write the second information to the multiple-level cell cursor in response to the write command to write the second information to the second zone. That is, based on the determination at 330, the memory system may determine to write information for the second zone directly to a multiple-level cell cursor.

At 340, the second information associated with the first type of information may be written to an SLC cursor of the memory system. For example, based on the determination at 330, the memory system may write the second information to the SLC cursor in response to the write command to write the second information to the second zone. That is, based on the determination at 330, the memory system may determine to write information for the second zone directly to an SLC cell cursor.

By supporting the writing of some types of information directly to multiple-level cell cursors, the memory system reduces folding operations of the memory system associated with those types of information, which improves the TBW of the memory system, thereby reducing physical degradation of memory cells of the memory system and prolonging the life of the memory system.

Figure 4:
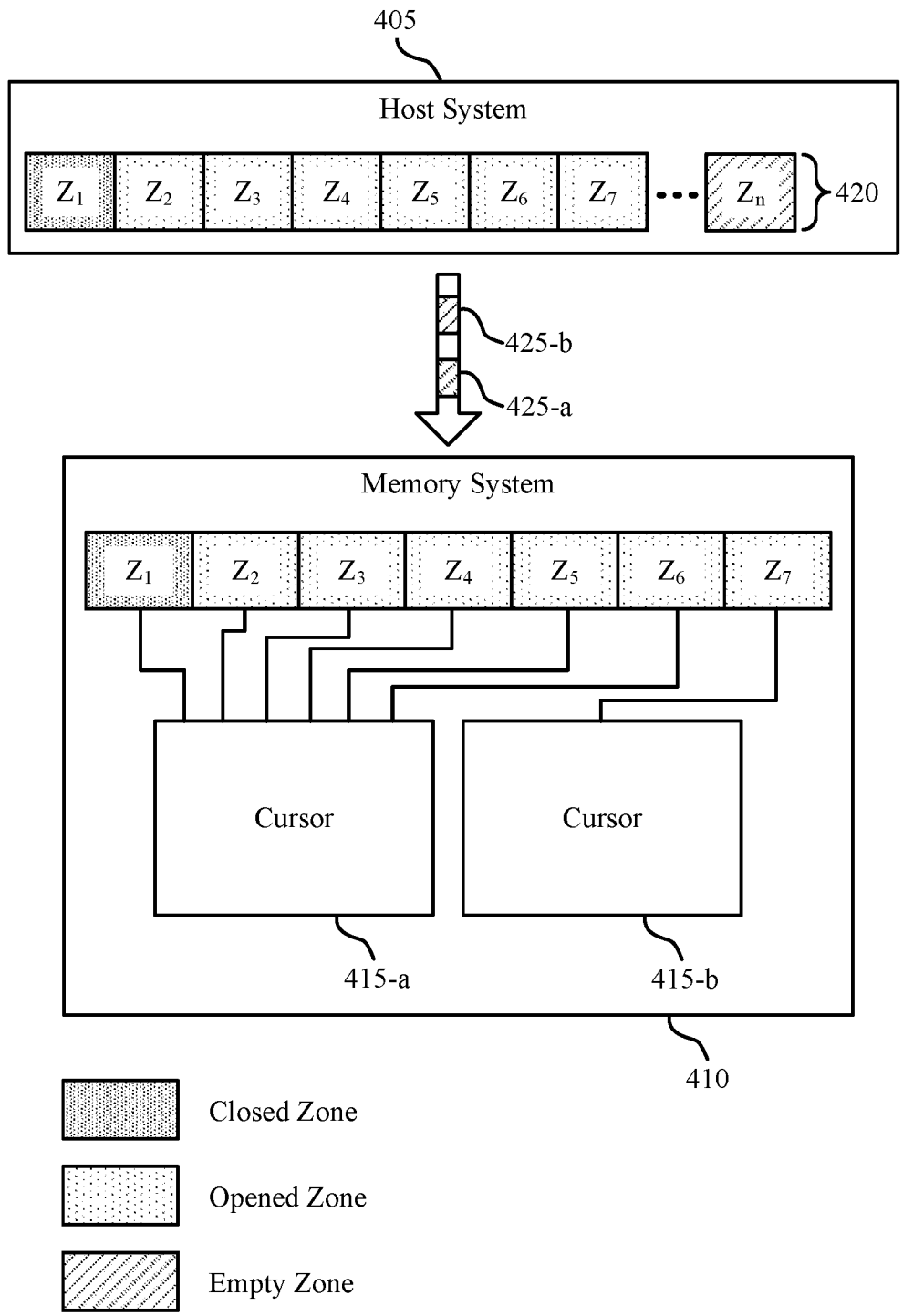
FIG. 4 illustrates an example of a system that supports zone write operation techniques in accordance with examples as disclosed herein.

FIG. 4 illustrates an example of a system 400 that supports zone write operation techniques in accordance with examples as disclosed herein. The system 400 may be an example of and implement aspects of a system 100 or 200, as described with reference to FIGS. 1 and 2, respectively. For example, the system 400 may include a host system 405 and a memory system 410, which may be examples of host system 105 and a memory system 110 described with reference to FIG. 1, respectively. In some cases, the memory system 410 may be configured to write information (e.g., data, metadata) directly to a multiple-level cell cursor of the memory system 410, for example, to reduce the TBW associated with folding information from multiple-level cell cursors storing multiple types of information to respective multiple-level cell cursors storing a single type of information, thereby decreasing physical degradation of memory cells of the memory system 410 and extending the life of the memory system 410, among other benefits.

The system 400 may implement a ZNS architecture implemented by a flash memory management system that includes zones 420, as described herein. For instance, the range of logical addresses of the memory system 410 may be divide into any quantity of zones 420 (e.g., zones $Z_1$ through $Z_n$, which may be examples of zones 220) and the host system 405 may write information of different types to respective zones 420.

The memory system 410 may include cursors 415 to which the memory system may store information written to the zones 420. For example, the memory system 410 may include a cursor 415-a and a cursor 415-b, (e.g., among other cursors 415, not shown) which may be examples of multiple-level cell cursors such as a cursor 215-b described with reference to FIG. 2.

In the example of FIG. 4, the memory system 410 may be configured to initially store information written to any open zone to a same cursor 415. For example, zones $Z_1$ through $Z_6$ may be initially opened and may each be configured to store a different type of information. The host system 405 may transmit commands 425 (e.g., write commands) to write respective information to the zones $Z_1$ through $Z_6$, and the memory system 410 may write the respective information to the cursor 415-a for storage. In other words, the cursor 415-a may store a mixture of the various types of information written to the zones $Z_1$ through $Z_6$. The memory system 410 may be configured to separate the mixed information during one or more folding operations, such that each type of information of the mix of different types of information may be written (e.g., moved, transferred, rewritten) to a separate cursor 415 of the memory system 410 that is configured to exclusively store the type of information. In some implementations, the folding operations may include one or more garbage collection operations.

In some cases, the memory system 410 may support two or more cursors 415 to be concurrently open. For example, the memory system 410 may support maintaining both the cursor 415-a and the cursor 415-b open at the same time, such that the memory system 410 may write zone information to either the cursor 415-a or the cursor 415-b. To reduce folding operations associated with sorting mixed information, the memory system 410 may determine to write a single type of information to the cursor 415-b and write all other types of information to the cursor 415-a (e.g., or another cursor 415-c after locations associated with the cursor 415-a have been written to).

The memory system 410 may determine the type of information to write to the cursor 415-b in response to a zone storing the type of information being closed. For example, the zone $Z_1$ may reach a full state (e.g., in response to a command 425-a) which may cause the memory system 410 to close the zone $Z_1$ and the host system 405 to open a zone $Z_7$ for storing the type of information. If the memory system 410 determines that a rate at which the type of information is written to the memory system 410 is the highest rate (e.g., the type of information is hot data) relative to other rates at which the other types of information are written to the memory system 410 (e.g., or satisfies a threshold rate), the memory system 410 may determine to write information written to zone $Z_7$ to the cursor 415-b. Here, the memory system 410 may continue to mix information written to zones $Z_2$ through $Z_6$ for storage in the cursor 415-a. That is, the cursor 415-b may exclusively store the type of information written to zone $Z_7$ (e.g., and subsequently opened zones for storing the type of information). Alternatively, if rate is not the highest rate (e.g., or fails to satisfy the threshold rate), the memory system 410 may write information written to zone $Z_7$ to the cursor 415-a to be mixed with the other types of information.

In an example, the host system 405 may transmit a write command (e.g., a command 425-a) indicating hot data to write to zone $Z_1$, which may cause the zone $Z_1$ to enter the full state and the memory system to thus close the zone $Z_1$. In response to the zone $Z_1$ closing, the host system 405 may open the zone $Z_7$ for storing hot data and may transmit a command 425-b indicating hot data to write to the zone $Z_7$. The memory system 410 may compare a hot data rate to other information rates and determine that the hot data rate is the highest information rate. In response to the command 425-b and the hot data rate being the highest information rate (e.g., or satisfying the threshold rate), the memory system 410 may store the hot data for zone $Z_7$ in the cursor 415-b rather than the cursor 415-a, where the cursor 415-b may be configured to exclusively store hot data.

In another example, the host system 405 may transmit a write command (e.g., command 425-a) indicating cold data (e.g., or some other information type of information that is not the highest information rate or fails to satisfy the threshold rate) to write to zone $Z_1$, which may cause the zone $Z_1$ to enter the full state and the memory system to thus close the zone $Z_1$. In response to the zone $Z_1$ closing, the host system 405 may open the zone $Z_7$ for storing cold data and may transmit a command 425-b indicating cold data to write to the zone $Z_7$. The memory system 410 may compare a cold data rate to other information rates and determine that the cold data rate is the not the highest information rate. In response to the command 425-b and the cold data rate not being the highest information rate (e.g., or failing to satisfy the threshold rate), the memory system 410 may store the hot data for zone $Z_7$ in the cursor 415-a for mixture with the other types of information written to the cursor 415-a.

By supporting exclusively writing information of a prioritized type to the cursor 415-b, the memory system 410 may avoid performing the folding operations on information written to the cursor 415-b. For example, because the information written to the cursor 415-b is unmixed with other types of information, separating information stored at the cursor 415-b into respective cursors 415 may be unnecessary and associated folding operations may not be performed as result. Additionally, by prioritizing the writing of information to the cursor 415-b that is associated with a highest information rate, a maximum quantity of folding operations may be avoided relative to if other types of information were exclusively written to the cursor 415-b. Thus, folding operations of the memory system 410 may be reduced, which may improve the TBW of the memory system 410, thereby reducing physical degradation of memory cells of the memory system 410 and prolonging the life of the memory system 410.

Figure 5:
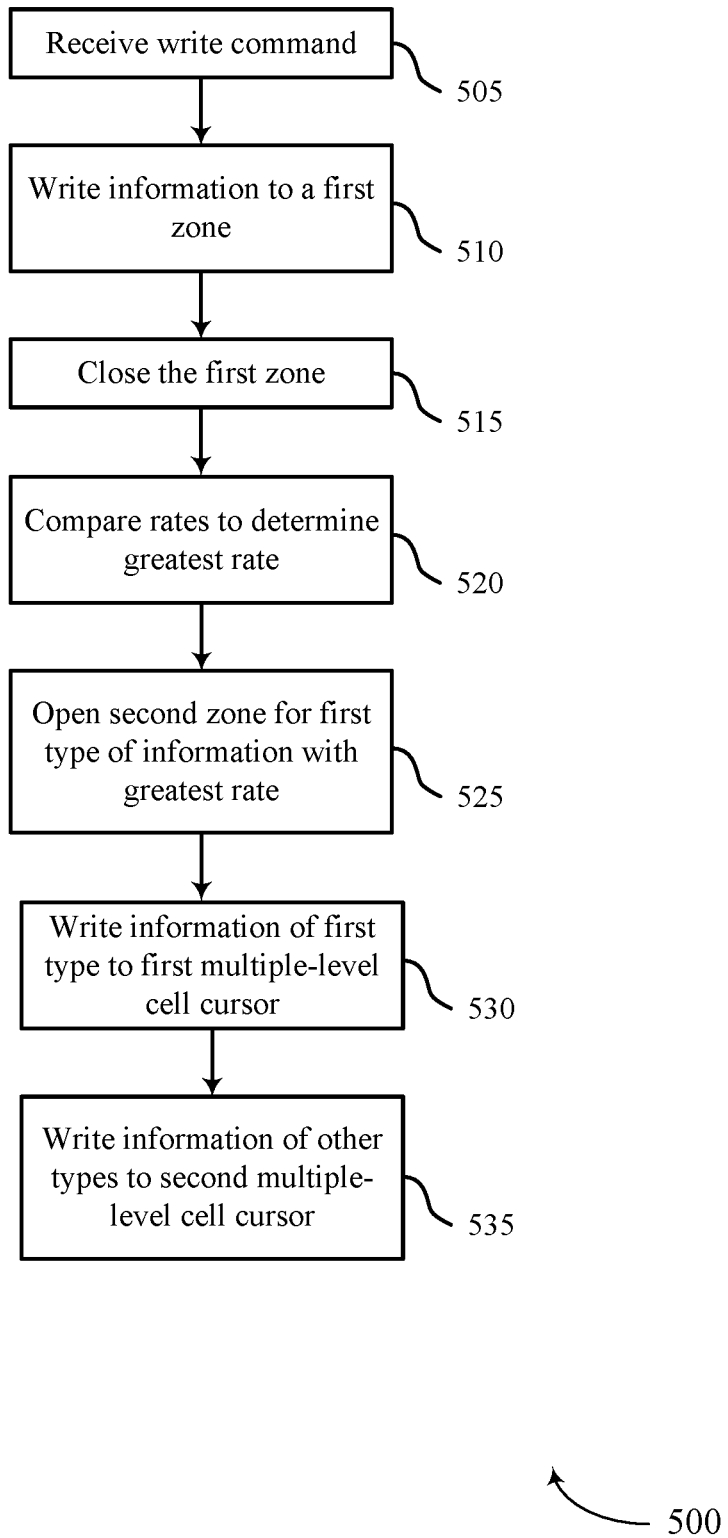
FIG. 5 illustrates an example of a process flow that supports zone write operation techniques in accordance with examples as disclosed herein.

FIG. 5 illustrates an example of a process flow 500 that supports zone write operation techniques in accordance with examples as disclosed herein. The process flow 500 may illustrate aspects or operations of systems 100 or 200, as described with reference to FIGS. 1 and 2, respectively. For example, the process flow 500 may depict operations at a memory system or a host system which, which may be examples of a memory system 110 or 410 and a host system 105 and 405, respectively, as described with reference to FIGS. 1 and 4. In the following description of the process flow 500, the methods, techniques, processes, and operations may be performed in different orders or at different times. Further, some operations may be left out of the process flow 500, or other operations may be added to the process flow 500. The operations described herein may reduce the TBW associated with folding information from multiple-level cell cursors storing multiple types of information to respective multiple-level cell cursors that each store a single type of information, thereby decreasing physical degradation of memory cells of the memory system and extending the life of the memory system, among other benefits.

Aspects of the process flow 500 may be implemented by a controller, among other components. Additionally, or alternatively, aspects of the process flow 500 may be implemented as instructions stored in memory (e.g., firmware stored in a memory coupled with a memory system or a host system). For example, the instructions, when executed by a controller (e.g., the memory system or host system), may cause the controller to perform the operations of the process flow 500.

At 505, a write command may be received. For example, the memory system may receive a write command from the host system to write first information associated with a first type of information (e.g., hot data) to be written to a first zone the memory system (e.g., a zone 420).). In some examples, the write command may include an indication (e.g., hint) that the first information is the first type. In some examples, the write command may exclude such an indication.

At 510, the first information of the first type may be written to the first zone of the memory system. For example, in response to the write command, the memory system may write the first information to the first zone that is configured to store the first type of information. To write the first information to the first zone, the memory system may write first information to a multiple-level cell cursor configured to store multiple types of information (e.g., every type of information).

At 515, the first zone may be closed (e.g., from being written with additional information). For example, the first zone may enter (e.g., transition to) a full state based on being written with the first information, and the memory system (e.g., and the host system) may close the first zone in response such that the first zone may not store additional information.

At 520, the first rate of the first type of information may be compared to rates of other types of information written to the memory system. For example, in response to closing the first zone, the memory system may determine the first rate and the rates of the other types of information (e.g., determine the rate of the first zone relative to other zones, determine a quantity of indications in writes commands of the first type relative quantities of the indications of the other types of information) and compare the first rate to the rates of the other types of information. Here, the memory system may determine that the first rate is the highest rate of the information rates. Additionally, or alternatively, the memory system may compare the first rate to a threshold rate.

At 525, a second zone for storing the first type of information may be opened. For example, the host system may open (e.g., begin writing to) the second zone and transmit a write command to store second information associated with the first type of information to the second zone.

At 530, the second information associated with the first type of information may be written to a first multiple-level cell cursor of the memory system, where the first multiple-level cell cursor is dedicated to storing the first type of information (e.g., exclusively stores the first type of information). For example, because the first rate is determined to be the highest rate (e.g., or satisfies the threshold rate), the memory system may determine to write information of the first type (e.g., the second information) to its own multiple-level cell cursor rather than being written to a multiple-level cell cursor that stores multiple types of information.

At 535, third information of the other types of information (e.g., excluding the first type of information) may be written to a second multiple-level cell cursor of the memory system, where the second multiple-level cell cursor is dedicated to storing the other types of information. The second multiple-level cell cursor may be the same as the multiple-level cell cursor used to store the mix of different types of information (e.g., if the cursor is not full) or different from the multiple-level cell cursor (e.g., if the cursor has been filled). In some cases, the second information may be received from the host system as part of a second (e.g., or third) write command to write information to another open zone for storing another type of information other than the first type of information.

By supporting the writing of a prioritized type of information directly to a multiple-level cell cursors that exclusively stores the prioritized type of information, the memory system reduces (e.g., or eliminates) folding operations of the memory system associated with writing the prioritized type of information, which improves the TBW of the memory system, thereby reducing physical degradation of memory cells of the memory system and prolonging the life of the memory system.

Figure 6:
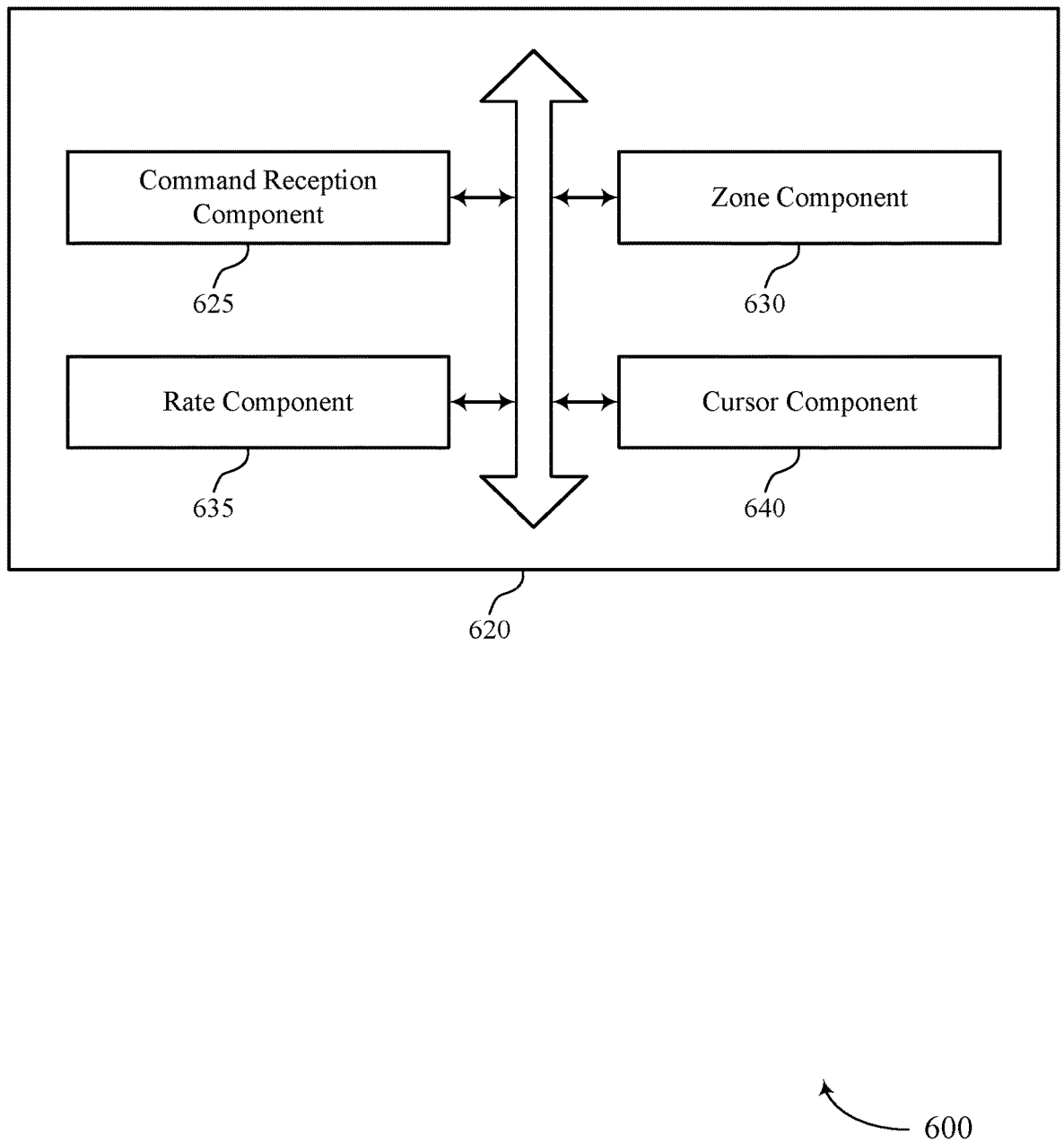
FIG. 6 shows a block diagram of a memory system that supports zone write operation techniques in accordance with examples as disclosed herein.

FIG. 6 shows a block diagram 600 of a memory system 620 that supports zone write operation techniques in accordance with examples as disclosed herein. The memory system 620 may be an example of aspects of a memory system as described with reference to FIGS. 1 through 5. The memory system 620, or various components thereof, may be an example of means for performing various aspects of zone write operation techniques as described herein. For example, the memory system 620 may include a command reception component 625, a zone component 630, a rate component 635, a cursor component 640, or any combination thereof. Each of these components may communicate, directly or indirectly, with one another (e.g., via one or more buses).

The command reception component 625 may be configured as or otherwise support a means for receiving a first command to write first information associated with a first type of information of a plurality of types of information to a first zone of a memory system, the first zone for storing the first type of information and corresponding to a first range of logical addresses of the memory system. The zone component 630 may be configured as or otherwise support a means for closing the first zone from being written with additional information based at least in part on writing the first information to the first zone. The rate component 635 may be configured as or otherwise support a means for determining, based at least in part on closing the first zone, a first rate at which the first type of information is written to the memory system. In some examples, the command reception component 625 may be configured as or otherwise support a means for receiving, based at least in part on closing the first zone, a second command to write second information associated with the first type of information to a second zone of the memory system, the second zone for storing the first type of information and corresponding to a second range of logical addresses of the memory system. The cursor component 640 may be configured as or otherwise support a means for writing, based at least in part on the first rate, the second information to a cursor of the memory system for storing information written to the second zone that includes a set of multiple-level memory cells.

In some examples, the rate component 635 may be configured as or otherwise support a means for determining, based at least in part on closing the first zone, the first rate relative to other rates at which other types of information of the plurality of types of information are written to the memory system, where the cursor includes the set of multiple-level memory cells based at least in part on the first rate being greater than the other rates at which the other types of information are written to the memory system.

In some examples, the rate component 635 may be configured as or otherwise support a means for determining, based at least in part on closing the first zone, whether the first rate satisfies a threshold rate, where the cursor includes the set of multiple-level memory cells based at least in part on the first rate satisfying the threshold rate.

In some examples, the zone component 630 may be configured as or otherwise support a means for closing a third zone from being written with additional information, where the third zone is for storing a second type of information of the plurality of types of information. In some examples, the rate component 635 may be configured as or otherwise support a means for determining, based at least in part on closing the third zone, a second rate at which the second type of information is written to the memory system. In some examples, the command reception component 625 may be configured as or otherwise support a means for receiving, based at least in part on closing the third zone, a third command to write third information associated with the second type of information to a fourth zone of the memory system, the fourth zone for storing the second type of information and corresponding to a third range of logical addresses of the memory system. In some examples, the cursor component 640 may be configured as or otherwise support a means for writing, while the cursor is open and based at least in part on the second rate, the third information to a second cursor of the memory system for storing information written to the fourth zone that includes a second set of multiple-level memory cells.

In some examples, the rate component 635 may be configured as or otherwise support a means for determining, based at least in part on closing the third zone, the second rate relative to the first rate and other rates at which other types of information of the plurality of types of information are written to the memory system, where the second rate is less than the first rate, and where the second cursor includes the second set of multiple-level memory cells based at least in part on the second rate being greater than the other rates at which the other types of information are written to the memory system and a capability of the memory system to have two or more cursors that include multiple-level memory cells concurrently open and written to in response to commands from a host system.

In some examples, the zone component 630 may be configured as or otherwise support a means for closing a third zone from being written with additional information, where the third zone is for storing a second type of information. In some examples, the rate component 635 may be configured as or otherwise support a means for determining, based at least in part on closing the third zone, a second rate at which the second type of information is written to the memory system. In some examples, the command reception component 625 may be configured as or otherwise support a means for receiving, based at least in part on closing the third zone, a third command to write third information associated with the second type of information to a fourth zone of the memory system, the fourth zone for storing the second type of information and corresponding to a third range of logical addresses of the memory system. In some examples, the cursor component 640 may be configured as or otherwise support a means for writing, based at least in part on the second rate, the third information to a second cursor of the memory system for storing information written to the fourth zone that includes a set of single level memory cells.

In some examples, the rate component 635 may be configured as or otherwise support a means for determining, based at least in part on closing the third zone, the second rate relative to the first rate and other rates at which other types of information of the plurality of types of information are written to the memory system, where the second cursor includes the set of single level memory cells based at least in part on the second rate being less than the first rate, one or more of the other rates at which the other types of information are written to the memory system, or any combination thereof.

In some examples, the rate component 635 may be configured as or otherwise support a means for determining, based at least in part on closing the third zone, whether the second rate satisfies a threshold rate, where the second cursor includes the set of single level memory cells based at least in part on the second rate failing to satisfy the threshold rate.

In some examples, the cursor component 640 may be configured as or otherwise support a means for writing the first information to a second cursor of the memory system for storing information associated with the plurality of types of information and including a second set of multiple-level memory cells.

In some examples, the cursor may be exclusively for storing information associated with the first type of information based at least in part on the first rate, and the cursor component 640 may be configured as or otherwise support a means for refraining from writing additional information associated with the first type of information to the second cursor based at least in part on the cursor being exclusively for storing information associated with the first type of information.

In some examples, the first zone is one zone of a plurality of zones and each zone of the plurality of zones is for storing a type of information of the plurality of types of information.

In some examples, information written to each zone of the plurality of zones is stored in a respective cursor of the memory system that includes a respective set of single level memory cells that each store a single bit of information.

In some examples, the set of multiple-level memory cells includes tri-level memory cells that are each configured to store three bits of information.

In some examples, the plurality of types of information includes hot data, warm data, cold data, hot metadata, warm metadata, cold metadata, or any combination thereof.

Figure 7:
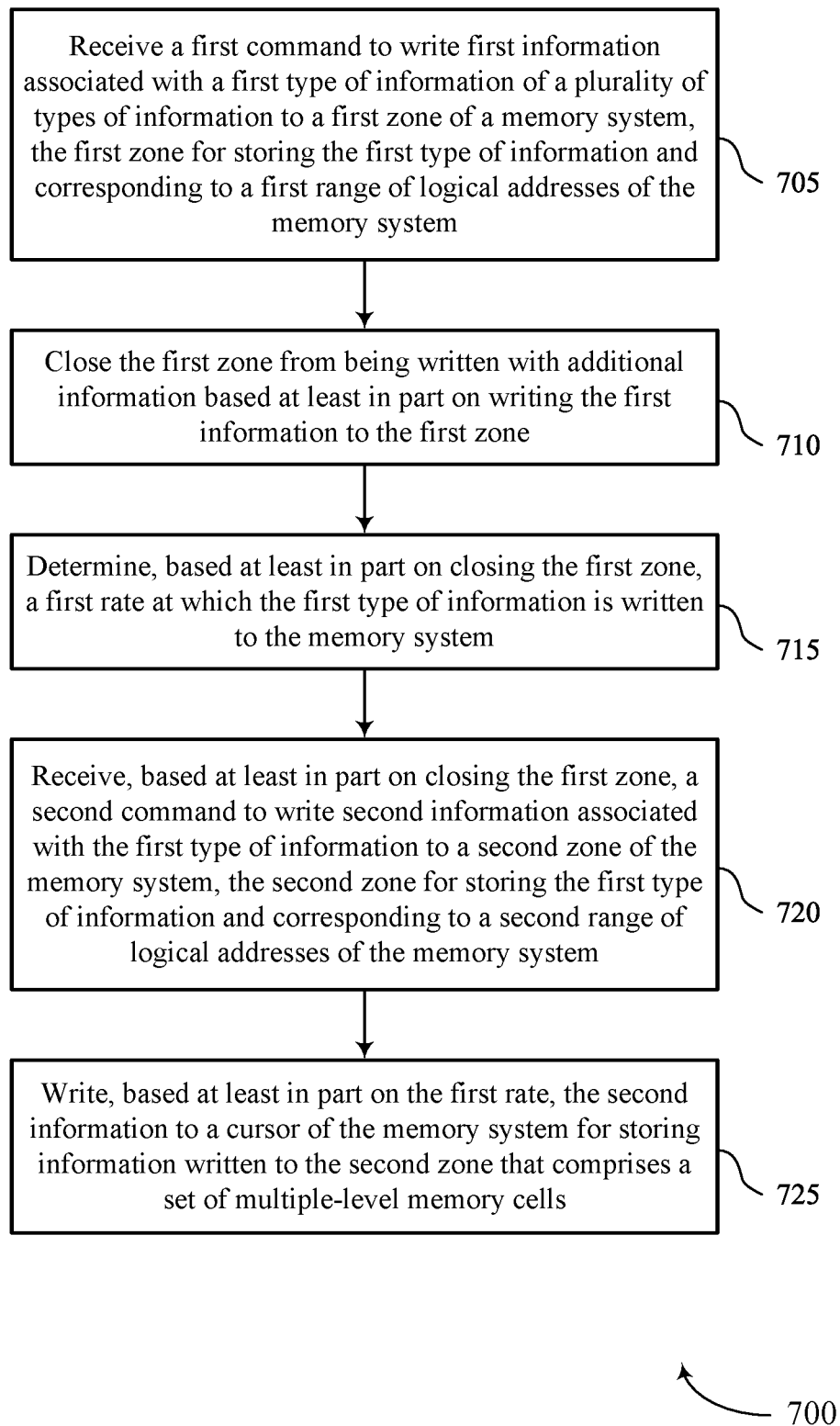
FIG. 7 shows a flowchart illustrating a method or methods that support zone write operation techniques in accordance with examples as disclosed herein.

FIG. 7 shows a flowchart illustrating a method 700 that supports zone write operation techniques in accordance with examples as disclosed herein. The operations of method 700 may be implemented by a memory system or its components as described herein. For example, the operations of method 700 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 705, the method may include receiving a first command to write first information associated with a first type of information of a plurality of types of information to a first zone of a memory system, the first zone for storing the first type of information and corresponding to a first range of logical addresses of the memory system. The operations of 705 may be performed in accordance with examples as disclosed herein. In some examples, aspects of the operations of 705 may be performed by a command reception component 625 as described with reference to FIG. 6.

At 710, the method may include closing the first zone from being written with additional information based at least in part on writing the first information to the first zone. The operations of 710 may be performed in accordance with examples as disclosed herein. In some examples, aspects of the operations of 710 may be performed by a zone component 630 as described with reference to FIG. 6.

At 715, the method may include determining, based at least in part on closing the first zone, a first rate at which the first type of information is written to the memory system. The operations of 715 may be performed in accordance with examples as disclosed herein. In some examples, aspects of the operations of 715 may be performed by an rate component 635 as described with reference to FIG. 6.

At 720, the method may include receiving, based at least in part on closing the first zone, a second command to write second information associated with the first type of information to a second zone of the memory system, the second zone for storing the first type of information and corresponding to a second range of logical addresses of the memory system. The operations of 720 may be performed in accordance with examples as disclosed herein. In some examples, aspects of the operations of 720 may be performed by a command reception component 625 as described with reference to FIG. 6.

At 725, the method may include writing, based at least in part on the first rate, the second information to a cursor of the memory system for storing information written to the second zone that includes a set of multiple-level memory cells. The operations of 725 may be performed in accordance with examples as disclosed herein. In some examples, aspects of the operations of 725 may be performed by a cursor component 640 as described with reference to FIG. 6.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a first command to write first information associated with a first type of information of a plurality of types of information to a first zone of a memory system, the first zone for storing the first type of information and corresponding to a first range of logical addresses of the memory system; closing the first zone from being written with additional information based at least in part on writing the first information to the first zone; determining, based at least in part on closing the first zone, a first rate at which the first type of information is written to the memory system; receiving, based at least in part on closing the first zone, a second command to write second information associated with the first type of information to a second zone of the memory system, the second zone for storing the first type of information and corresponding to a second range of logical addresses of the memory system; and writing, based at least in part on the first rate, the second information to a cursor of the memory system for storing information written to the second zone that includes a set of multiple-level memory cells.

Aspect 2: The method, apparatus, or non-transitory computer-readable medium of aspect 1, further including operations, features, circuitry, logic, means, or instructions, or any combination thereof for determining, based at least in part on closing the first zone, the first rate relative to other rates at which other types of information of the plurality of types of information are written to the memory system, where the cursor includes the set of multiple-level memory cells based at least in part on the first rate being greater than the other rates at which the other types of information are written to the memory system.

Aspect 3: The method, apparatus, or non-transitory computer-readable medium of any of aspects 1 through 2, further including operations, features, circuitry, logic, means, or instructions, or any combination thereof for determining, based at least in part on closing the first zone, whether the first rate satisfies a threshold rate, where the cursor includes the set of multiple-level memory cells based at least in part on the first rate satisfying the threshold rate.

Aspect 4: The method, apparatus, or non-transitory computer-readable medium of any of aspects 1 through 3, further including operations, features, circuitry, logic, means, or instructions, or any combination thereof for closing a third zone from being written with additional information, where the third zone is for storing a second type of information of the plurality of types of information; determining, based at least in part on closing the third zone, a second rate at which the second type of information is written to the memory system; receiving, based at least in part on closing the third zone, a third command to write third information associated with the second type of information to a fourth zone of the memory system, the fourth zone for storing the second type of information and corresponding to a third range of logical addresses of the memory system; and writing, while the cursor is open and based at least in part on the second rate, the third information to a second cursor of the memory system for storing information written to the fourth zone that includes a second set of multiple-level memory cells.

Aspect 5: The method, apparatus, or non-transitory computer-readable medium of aspect 4, further including operations, features, circuitry, logic, means, or instructions, or any combination thereof for determining, based at least in part on closing the third zone, the second rate relative to the first rate and other rates at which other types of information of the plurality of types of information are written to the memory system, where the second rate is less than the first rate, and where the second cursor includes the second set of multiple-level memory cells based at least in part on the second rate being greater than the other rates at which the other types of information are written to the memory system and a capability of the memory system to have two or more cursors that include multiple-level memory cells concurrently open and written to in response to commands from a host system.

Aspect 6: The method, apparatus, or non-transitory computer-readable medium of any of aspects 1 through 5, further including operations, features, circuitry, logic, means, or instructions, or any combination thereof for closing a third zone from being written with additional information, where the third zone is for storing a second type of information; determining, based at least in part on closing the third zone, a second rate at which the second type of information is written to the memory system; receiving, based at least in part on closing the third zone, a third command to write third information associated with the second type of information to a fourth zone of the memory system, the fourth zone for storing the second type of information and corresponding to a third range of logical addresses of the memory system; and writing, based at least in part on the second rate, the third information to a second cursor of the memory system for storing information written to the fourth zone that includes a set of single level memory cells.

Aspect 7: The method, apparatus, or non-transitory computer-readable medium of aspect 6, further including operations, features, circuitry, logic, means, or instructions, or any combination thereof for determining, based at least in part on closing the third zone, the second rate relative to the first rate and other rates at which other types of information of the plurality of types of information are written to the memory system, where the second cursor includes the set of single level memory cells based at least in part on the second rate being less than the first rate, one or more of the other rates at which the other types of information are written to the memory system, or any combination thereof Aspect 8: The method, apparatus, or non-transitory computer-readable medium of any of aspects 6 through 7, further including operations, features, circuitry, logic, means, or instructions, or any combination thereof for determining, based at least in part on closing the third zone, whether the second rate satisfies a threshold rate, where the second cursor includes the set of single level memory cells based at least in part on the second rate failing to satisfy the threshold rate.

Aspect 9: The method, apparatus, or non-transitory computer-readable medium of any of aspects 1 through 8, further including operations, features, circuitry, logic, means, or instructions, or any combination thereof for writing the first information to a second cursor of the memory system for storing information associated with the plurality of types of information and including a second set of multiple-level memory cells.

Aspect 10: The method, apparatus, or non-transitory computer-readable medium of aspect 9, where the cursor is exclusively for storing information associated with the first type of information based at least in part on the first rate, the method, apparatus, or non-transitory computer-readable medium further including operations, features, circuitry, logic, means, or instructions, or any combination thereof for refraining from writing additional information associated with the first type of information to the second cursor based at least in part on the cursor being exclusively for storing information associated with the first type of information.

Aspect 11: The method, apparatus, or non-transitory computer-readable medium of any of aspects 1 through 8, where the first zone is one zone of a plurality of zones and each zone of the plurality of zones is for storing a type of information of the plurality of types of information.

Aspect 12: The method, apparatus, or non-transitory computer-readable medium of aspect 11, where information written to each zone of the plurality of zones is stored in a respective cursor of the memory system that includes a respective set of SLCs that each store a single bit of information.

Aspect 13: The method, apparatus, or non-transitory computer-readable medium of any of aspects 1 through 12, where the set of multiple-level memory cells includes TLCs that are each configured to store three bits of information.

Aspect 14: The method, apparatus, or non-transitory computer-readable medium of any of aspects 1 through 13, where the plurality of types of information includes hot data, warm data, cold data, hot metadata, warm metadata, cold metadata, or any combination thereof.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   one or more memory devices comprising non-volatile memory cells; and
   processing circuitry coupled with the one or more memory devices and configured to cause the memory system to:
      receive a first command to write first information associated with a first type of information of a plurality of types of information to a first zone of the memory system, the first zone for storing the first type of information and corresponding to a first range of logical addresses of the memory system;
      write, based at least in part on receiving the first command, the first information to a first set of memory cells corresponding to a single-level memory cell cursor of a plurality of cursors associated with the memory system, the first set of memory cells within the first zone of the memory system;
      close the first zone from being written with additional information based at least in part on writing the first information;
      determine, in response to closing the first zone, that a first rate at which the first type of information is written to the memory system satisfies a threshold rate associated with a multiple-level memory cell cursor of the plurality of cursors;
      receive, based at least in part on closing the first zone, a second command to write second information associated with the first type of information to a second zone of the memory system, the second zone for storing the first type of information and corresponding to a second range of logical addresses of the memory system; and
      write, based at least in part on the first rate satisfying the threshold rate, the second information to a second set of memory cells corresponding to the multiple-level memory cell cursor, the second set of memory cells within the second zone of the memory system.

2. The memory system of claim 1, wherein the processing circuitry is further configured to cause the memory system to:
   determine, based at least in part on closing the first zone, the first rate relative to other rates at which other types of information of the plurality of types of information are written to the memory system, wherein the multiple-level memory cell cursor comprises the second set of memory cells based at least in part on the first rate being greater than the other rates at which the other types of information are written to the memory system.

3. The memory system of claim 1,
   wherein the multiple-level memory cell cursor comprises the second set of memory cells based at least in part on the first rate satisfying the threshold rate.

4. The memory system of claim 1, wherein the processing circuitry is further configured to cause the memory system to:
   close a third zone from being written with additional information, wherein the third zone is for storing a second type of information of the plurality of types of information;
   determine, based at least in part on closing the third zone, a second rate at which the second type of information is written to the memory system;
   receive, based at least in part on closing the third zone, a third command to write third information associated with the second type of information to a fourth zone of the memory system, the fourth zone for storing the second type of information and corresponding to a third range of logical addresses of the memory system; and
   write, while the multiple-level memory cell cursor is open and based at least in part on the second rate, the third information to a second multiple-level memory cell cursor of the plurality of cursors for storing information written to the fourth zone that comprises a third set of memory cells.

5. The memory system of claim 4, wherein the processing circuitry is further configured to cause the memory system to:
determine, based at least in part on closing the third zone, the second rate relative to the first rate and other rates at which other types of information of the plurality of types of information are written to the memory system, wherein the second rate is less than the first rate, and
wherein the second multiple-level memory cell cursor comprises the third set of memory cells based at least in part on the second rate being greater than the other rates at which the other types of information are written to the memory system and a capability of the memory system to have two or more multiple-level memory cell cursors that comprise memory cells concurrently open and written to in response to commands from a host system.

6. The memory system of claim 1, wherein the processing circuitry is further configured to cause the memory system to:
close a third zone from being written with additional information, wherein the third zone is for storing a second type of information;
determine, based at least in part on closing the third zone, a second rate at which the second type of information is written to the memory system;
receive, based at least in part on closing the third zone, a third command to write third information associated with the second type of information to a fourth zone of the memory system, the fourth zone for storing the second type of information and corresponding to a third range of logical addresses of the memory system; and
write, based at least in part on the second rate, the third information to a second single-level memory cell cursor of the plurality of cursors for storing information written to the fourth zone that comprises a third set of memory cells.

7. The memory system of claim 6, wherein the processing circuitry is further configured to cause the memory system to:
determine, based at least in part on closing the third zone, the second rate relative to the first rate and other rates at which other types of information of the plurality of types of information are written to the memory system, wherein the second single-level memory cell cursor comprises the third set of memory cells based at least in part on the second rate being less than the first rate, one or more of the other rates at which the other types of information are written to the memory system, or any combination thereof.

8. The memory system of claim 6, wherein the processing circuitry is further configured to cause the memory system to: determine, based at least in part on closing the third zone, whether the second rate satisfies a second threshold rate, wherein the second single-level memory cell cursor comprises the third set of memory cells based at least in part on the second rate failing to satisfy the second threshold rate.

9. The memory system of claim 1, wherein the first zone is one zone of a plurality of zones and each zone of the plurality of zones is for storing a type of information of the plurality of types of information.

10. The memory system of claim 9,
wherein information written to each zone of the plurality of zones is stored in a respective single-level memory cell cursor of the plurality of cursors that comprises a respective set of memory cells that each store a single bit of information.

11. The memory system of claim 1, wherein:
the second set of memory cells comprises tri-level memory cells that are each configured to store three bits of information.

12. The memory system of claim 1, wherein the plurality of types of information comprises hot data, warm data, cold data, hot metadata, warm metadata, cold metadata, or any combination thereof.

13. A non-transitory computer-readable medium storing code, the code comprising instructions executable by a processing circuitry to:
receive a first command to write first information associated with a first type of information of a plurality of types of information to a first zone of a memory system, the first zone for storing the first type of information and corresponding to a first range of logical addresses of the memory system;
write, based at least in part on receiving the first command, the first information to a first set of memory cells corresponding to a single-level memory cell cursor of a plurality of cursors associated with the memory system, the first set of memory cells within the first zone of the memory system;
close the first zone from being written with additional information based at least in part on writing the first information;
determine, in response to closing the first zone, that a first rate at which the first type of information is written to the memory system satisfies a threshold rate associated with a multiple-level memory cell cursor of the plurality of cursors;
receive, based at least in part on closing the first zone, a second command to write second information associated with the first type of information to a second zone of the memory system, the second zone for storing the first type of information and corresponding to a second range of logical addresses of the memory system; and
write, based at least in part on the first rate satisfying the threshold rate, the second information to a second set of memory cells corresponding to the multiple-level memory cell cursor, the second set of memory cells within the second zone of the memory system.

14. The non-transitory computer-readable medium of claim 13, wherein the instructions are further executable by the processing circuitry to:
determine, based at least in part on closing the first zone, the first rate relative to other rates at which other types of information of the plurality of types of information are written to the memory system, wherein the multiple-level memory cell cursor comprises the second set of memory cells based at least in part on the first rate being greater than the other rates at which the other types of information are written to the memory system.

15. The non-transitory computer-readable medium of claim 13, wherein the instructions are further executable by the processing circuitry to:
close a third zone from being written with additional information, wherein the third zone is for storing a second type of information of the plurality of types of information;
determine, based at least in part on closing the third zone, a second rate at which the second type of information is written to the memory system;
receive, based at least in part on closing the third zone, a third command to write third information associated with the second type of information to a fourth zone of the memory system, the fourth zone for storing the second type of information and corresponding to a third range of logical addresses of the memory system; and write, while the multiple-level memory cell cursor is open and based at least in part on the second rate, the third information to a second multiple-level memory cell cursor of the plurality of cursors for storing information written to the fourth zone that comprises a third set of memory cells.

16. The non-transitory computer-readable medium of claim 15, wherein the instructions are further executable by the processing circuitry to:

determine, based at least in part on closing the third zone, the second rate relative to the first rate and other rates at which other types of information of the plurality of types of information are written to the memory system, wherein the second rate is less than the first rate, and wherein the second multiple-level memory cell cursor comprises the third set of memory cells based at least in part on the second rate being greater than the other rates at which the other types of information are written to the memory system and a capability of the memory system to have two or more multiple-level memory cell cursors that comprise memory cells concurrently open and written to in response to commands from a host system.

17. The non-transitory computer-readable medium of claim 13, wherein the instructions are further executable by the processing circuitry to:

close a third zone from being written with additional information, wherein the third zone is for storing a second type of information;

determine, based at least in part on closing the third zone, a second rate at which the second type of information is written to the memory system;

receive, based at least in part on closing the third zone, a third command to write third information associated with the second type of information to a fourth zone of the memory system, the fourth zone for storing the second type of information and corresponding to a third range of logical addresses of the memory system; and write, based at least in part on the second rate, the third information to a second single-level memory cell cursor of the plurality of cursors for storing information written to the fourth zone that comprises a third set of memory cells.

18. The non-transitory computer-readable medium of claim 17, wherein the instructions are further executable by the processing circuitry to:

determine, based at least in part on closing the third zone, the second rate relative to the first rate and other rates at which other types of information of the plurality of types of information are written to the memory system, wherein the second single-level memory cell cursor comprises the third set of memory cells based at least in part on the second rate being less than the first rate, one or more of the other rates at which the other types of information are written to the memory system, or any combination thereof.

19. The non-transitory computer-readable medium of claim 17, wherein the instructions are further executable by the processing circuitry to: determine, based at least in part on closing the third zone, whether the second rate satisfies a second threshold rate, wherein the second single-level memory cell cursor the third set of memory cells based at least in part on the second rate failing to satisfy the second threshold rate.

20. The non-transitory computer-readable medium of claim 13, wherein the first zone is one zone of a plurality of zones and each zone of the plurality of zones is for storing a type of information of the plurality of types of information, and wherein information written to each zone of the plurality of zones is stored in a respective single-level memory cell cursor of the plurality of cursors that comprises a respective set of single level memory cells that each store a single bit of information.

21. A method, comprising:

receiving a first command to write first information associated with a first type of information of a plurality of types of information to a first zone of a memory system, the first zone for storing the first type of information and corresponding to a first range of logical addresses of the memory system;

write, based at least in part on receiving the first command, the first information to a first set of memory cells corresponding to a single-level memory cell cursor of a plurality of cursors associated with the memory system, the first set of memory cells within the first zone of the memory system;

closing the first zone from being written with additional information based at least in part on writing the first information;

determining, in response to closing the first zone, that a first rate at which the first type of information is written to the memory system satisfies a threshold rate associated with a multiple-level memory cell cursor of the plurality of cursors;

receiving, based at least in part on closing the first zone, a second command to write second information associated with the first type of information to a second zone of the memory system, the second zone for storing the first type of information and corresponding to a second range of logical addresses of the memory system; and writing, based at least in part on the first rate satisfying the threshold rate, the second information to a second set of memory cells corresponding to the multiple-level memory cell cursor, the second set of memory cells within the second zone of the memory system.

22. The method of claim 21, further comprising:

determining, based at least in part on closing the first zone, the first rate relative to other rates at which other types of information of the plurality of types of information are written to the memory system, wherein the multiple-level memory cell cursor comprises the second set of memory cells based at least in part on the first rate being greater than the other rates at which the other types of information are written to the memory system.

23. The method of claim 21, further comprising:

close a third zone from being written with additional information, wherein the third zone is for storing a second type of information of the plurality of types of information;

determine, based at least in part on closing the third zone, a second rate at which the second type of information is written to the memory system;

receive, based at least in part on closing the third zone, a third command to write third information associated with the second type of information to a fourth zone of the memory system, the fourth zone for storing the second type of information and corresponding to a third range of logical addresses of the memory system; and write, while the multiple-level memory cell cursor is open and based at least in part on the second rate, the third information to a second multiple-level memory cell cursor of the plurality of cursors for storing information written to the fourth zone that comprises a third set of memory cells.

24. The method of claim 23, further comprising:
determine, based at least in part on closing the third zone, the second rate relative to the first rate and other rates at which other types of information of the plurality of types of information are written to the memory system, wherein the second rate is less than the first rate, and wherein the second multiple-level memory cell cursor comprises the third set of memory cells based at least in part on the second rate being greater than the other rates at which the other types of information are written to the memory system and a capability of the memory system to have two or more multiple-level memory cell cursors that comprise memory cells concurrently open and written to in response to commands from a host system.

25. The method of claim 21, further comprising:
close a third zone from being written with additional information, wherein the third zone is for storing a second type of information;
determine, based at least in part on closing the third zone, a second rate at which the second type of information is written to the memory system;
receive, based at least in part on closing the third zone, a third command to write third information associated with the second type of information to a fourth zone of the memory system, the fourth zone for storing the second type of information and corresponding to a third range of logical addresses of the memory system; and
write, based at least in part on the second rate, the third information to a second single-level memory cell cursor of the plurality of cursors for storing information written to the fourth zone that comprises a third set of memory cells.

* * * * *